(12) United States Patent
Schwob et al.

(10) Patent No.: US 7,564,006 B2
(45) Date of Patent: *Jul. 21, 2009

(54) APPARATUS FOR GENERATING A ROTATING LASER BEAM

(75) Inventors: Hans Peter Schwob, Uetendorf (CH); Joachim Hertzberg, Thun (CH); Walter Zürcher, Aarau (CH); Friedrich Durand, Solothum (CH); Bruno Knobel, Laufen (CH)

(73) Assignee: LASAG AG, Thun (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/557,049

(22) PCT Filed: May 13, 2004

(86) PCT No.: PCT/EP2004/050799

§ 371 (c)(1),
(2), (4) Date: Dec. 7, 2006

(87) PCT Pub. No.: WO2004/101213

PCT Pub. Date: Nov. 25, 2004

(65) Prior Publication Data

US 2007/0102404 A1    May 10, 2007

(30) Foreign Application Priority Data

May 16, 2003    (EP)    ................... 03011210

(51) Int. Cl.
*B23K 26/06* (2006.01)
(52) U.S. Cl. .................. 219/121.75; 219/121.63; 219/121.67; 219/121.74
(58) Field of Classification Search ........... 219/121.63, 219/121.74, 121.75, 121.83, 121.67, 121.73
See application file for complete search history.

(56) References Cited

U.S. PATENT DOCUMENTS

| 3,576,965 | A | | 5/1971 | Gugger |
| 3,981,705 | A | * | 9/1976 | Jaeger et al. ........... 219/121.74 |
| 4,160,894 | A | | 7/1979 | Stemmler et al. |
| 4,690,505 | A | * | 9/1987 | Iizuka et al. ................. 359/822 |
| 4,940,881 | A | | 7/1990 | Sheets |
| 5,096,511 | A | * | 3/1992 | Fetting .................. 219/121.78 |

(Continued)

FOREIGN PATENT DOCUMENTS

DE    36 01 442 A1    7/1987

(Continued)

OTHER PUBLICATIONS

Patent Abstracts of Japan, vol. 1997, No. 7, Jul. 31, 1997 & JP 9 066382 (Ishikawajima Harima Heavy Ind. Co., Ltd.) Mar. 11, 1997.

(Continued)

*Primary Examiner*—Geoffrey S Evans
(74) *Attorney, Agent, or Firm*—Sughrue Mion, PLLC

(57) ABSTRACT

An apparatus (1) for generating a rotating laser beam (5) which may used for various applications including welding, cutting, drilling or ablation of materials. More particularly, the apparatus is able to produce a fast rotating and accurate laser beam, because the main optical device (100) that is rotated consists of a reflecting surface (102) rotating about an axis (X1) that it intersects.

16 Claims, 4 Drawing Sheets

U.S. PATENT DOCUMENTS

| | | | |
|---|---|---|---|
| 6,204,979 B1 * | 3/2001 | Matsui | 359/819 |
| 6,318,912 B1 * | 11/2001 | Shono et al. | 359/822 |
| 6,326,585 B1 * | 12/2001 | Aleshin et al. | 219/121.63 |
| 6,362,455 B1 | 3/2002 | Lock | |
| 6,765,176 B2 * | 7/2004 | Kusnezow | 219/121.75 |
| 2007/0050147 A1 * | 3/2007 | Hertzberg et al. | 219/121.74 |

FOREIGN PATENT DOCUMENTS

| | | | | |
|---|---|---|---|---|
| JP | 61-99622 | A | * | 5/1986 |
| JP | 3-210990 | A | * | 9/1991 |
| JP | 7-195187 | A | * | 8/1995 |
| JP | 10-328870 | A | * | 12/1998 |

OTHER PUBLICATIONS

Database WPI Section CH, Week 198602, Derwent Publications, Ltd., London, GB; An 1986-011422 XP002297310 & JP 60 236482 (Mitsubishi Denki KK) Nov. 25, 1985

* cited by examiner

APPARATUS FOR GENERATING A ROTATING LASER BEAM

FIELD OF THE INVENTION

The present invention relates to an apparatus for generating a rotating laser beam and, more particularly, to such an apparatus allowing accurate and fast circular machining and/or welding. Such an apparatus can also advantageously be applied to the visioning of circular machining and/or welding regions.

BACKGROUND OF THE INVENTION

Although the following description relates specifically to a welding apparatus, it must be understood that, depending on the laser beam parameters, the apparatus according to the present invention can also been used for machining operations, such as cutting, drilling or ablation of materials.

Systems for circular welding with a laser beam, for example, are known from the prior art.

Some of these systems are based on the principle that the welding apparatus is arranged with respect to one or more workpieces to be welded in a stationary manner. The laser beam is directed to a welding region of the workpieces in a fixed direction, whereas the workpieces are driven in rotation by a support comprising motor means for that purpose.

However, such systems present many drawbacks in that it is difficult to precisely adjust the position of the workpiece with respect to the laser beam, this being especially critical when the workpiece is rotated at a high speed of rotation.

Further, the corresponding welding process takes a long time if there are a large number of workpieces to be welded successively. Indeed, in the process, the workpiece has to be positioned in its still support before the latter is driven in rotation with a high speed. Then the welding treatment is applied as soon as the workpiece is rotated faster than a predetermined rotating speed. After the welding treatment, the support has to stop rotating before the workpiece is removed from it and before the next workpiece is positioned.

Other systems are known, in which the workpiece remains still during the welding process, the laser beam direction being changed to sweep the whole welding region. In order to cover the whole welding region with the laser beam, two mirrors are arranged in the optical path of the laser beam so that they can be tilted independently of each other, each between two end positions. Thus, one of the mirrors is responsible for a movement of the laser beam along a first direction X-X' while the second mirror is responsible for a movement of the laser beam along a second direction Y-Y', perpendicular to the first direction X-X'. Consequently, the combination of the respective tilts of the two mirrors covers the whole welding region of the workpiece.

However, a drawback of such systems is that the larger the dimensions of the welding region, the further the end positions are from one another for each of the mirrors. Thus, the time necessary for a mirror to tilt from one end position to the other is longer, which leads to a decrease in the overall speed of the welding process.

Futher, JP 60-236482A in the name of Mitsubishi Electric Corp. and published on Nov. 25, 1985, discloses an apparatus for generating a rotating laser beam comprising a large focal length lens standing in a still position as regards the apparatus and a first reflecting surface mounted on a rotating support for being driven in rotation. The light reflected by the first reflecting surface is directed toward a second reflecting surface and then toward a third reflecting surface.

However, all three reflecting surfaces described in this document are of planar shape in cross-section and introduce thus an error in the shape of the image focus point formed on the workpiece to be welded, as they are combined with a large focal length lens.

SUMMARY OF THE INVENTION

A first object of the present invention is to improve the systems of the aforementioned prior art by providing an apparatus for performing a circular machining on at least one workpiece in a fast and reliable manner.

Thus, the present invention concerns such an apparatus comprising means for supplying a laser beam, said laser beam following an optical path through at least one optical system of the apparatus before emerging from said apparatus through an output before impinging onto an impact region of the workpiece. The optical system presents a central axis X1 and is at least intended to adjust the position of an image focal point of said laser beam in the impact region. The optical system further comprises a first reflecting surface able to rotate with respect to the central axis X1 and intended to redirect the laser beam into the direction of at least a second reflecting surface intended to reflect the laser beam towards the workpieces. The apparatus is characterised by the fact that it comprises means to drive the first reflecting surface together with the optical system in rotation. The apparatus according to the present invention is further characterised by the fact that the optical system comprises a rotating lens of optical axis X2 arranged so as to be tiltable, such that the optical axis X2 is able to be angled with respect to the central axis X1, to increase the quality of the image focus point on the workpiece.

Thus, circular machining, welding for example, can be obtained by a simple rotational movement of a reflecting surface, allowing the implementation of high rotational speeds, the rotational speed being independent of the dimensions of the welding.

Owing to its tiltable lens which is rotating together with the first reflecting surface, the quality of the image focus point on the workpiece can be finely adjusted. This last feature is thus an important additional improvement as regards the above mentioned known systems, in that with the latter no adjustment of the quality of the laser beam is provided, such adjustment taking into account the motion of the reflective surface.

According to a preferred embodiment of the present invention, the first reflecting surface is arranged in a stationary manner in the optical system, the latter being able to rotate with respect to the central axis X1 via the action of said motor means.

BRIEF DESCRIPTION OF THE DRAWINGS

The present invention will now be described in more detail with reference to the accompanying drawings which illustrate the structure of the welding apparatus of the present invention. This invention may, however, be embodied in many different forms and should not be construed as limited to the embodiment set forth herein.

DETAILED DESCRIPTION OF THE PREFERRED EMBODIMENTS

Figure 1:
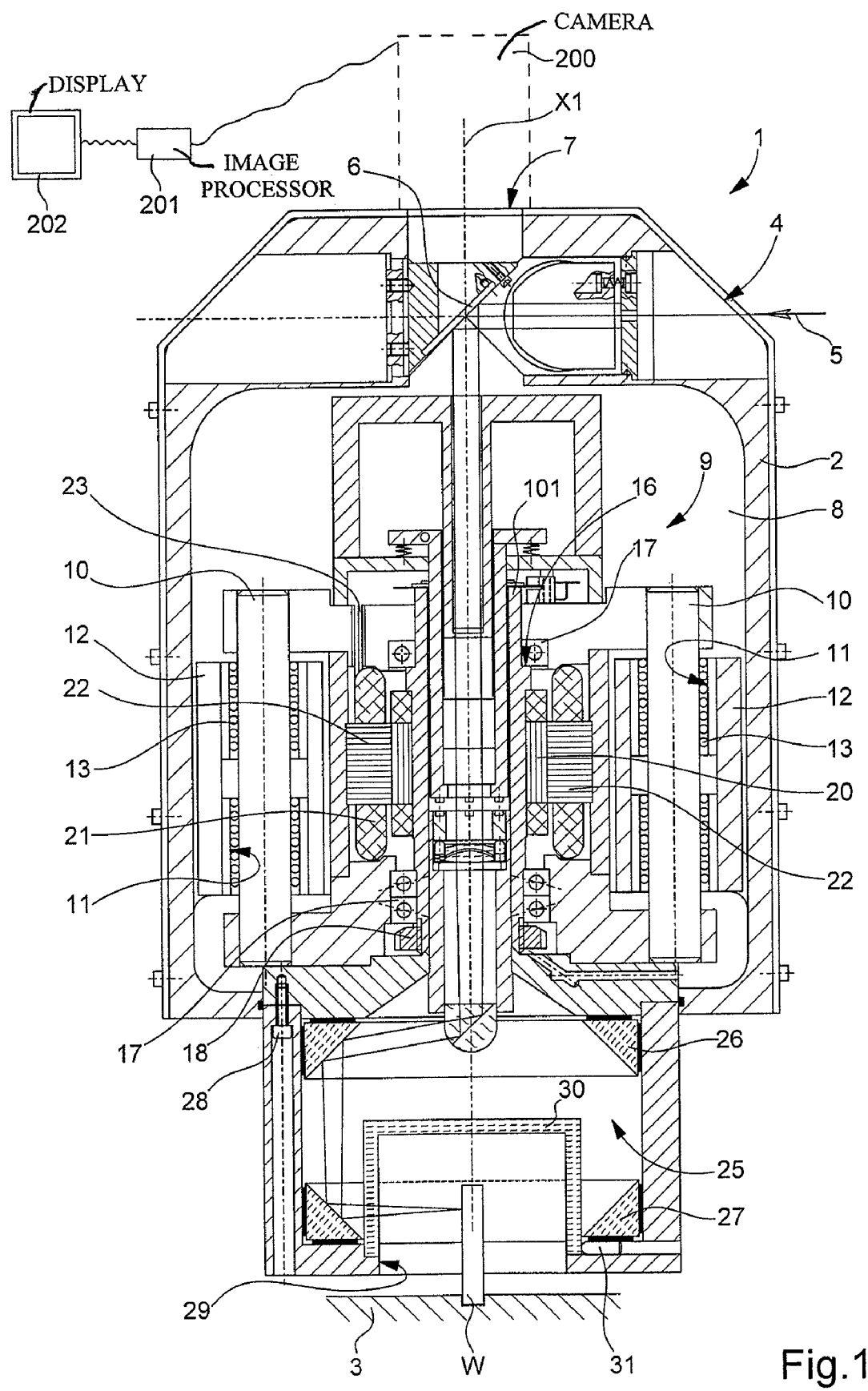
FIG. 1 is a cross-sectional schematic view of a laser welding apparatus in accordance with a prefered embodiment of the present invention.

Referring now initially to FIG. 1, a laser beam welding apparatus 1 in accordance with the present invention is described. The apparatus 1 comprises a main housing 2 in which are enclosed most of the constituent elements of the apparatus. The main housing 2 comprises means (not shown), such as feet for example, to be positioned on a worktable 3 above a workpiece W holding tool (not represented in detail).

The main housing comprises a side opening 4 through which a laser beam 5 passes, along a substantially horizontal direction, said beam being generated by a remote laser source (not shown). The laser beam 5 is, directed onto a semi-transparent mirror 6 at an angle of approximately 45 degrees with respect to the incident laser beam to redirect the latter in a substantially vertical direction.

Further, a top opening 7 is provided above the back side of the semi-transparent mirror 6 to be used, in a conventional manner, as an observation window for the positioning of an optical sensor 200, such as a CCD camera for example The optical sensor may be connected to a signal processing unit 201 comprising, in particular, a processor, the processing unit possibly being connected to a display 202.

Following the optical path of the laser beam downwards from the semi-transparent mirror 6 there is provided a main chamber 8, in which a movable unit 9, able to be translated in the direction of a central axis X1 is partially enclosed. The movable unit 9 is connected to the main housing 2 through lateral arms 10 extending in a direction parallel to the central axis X1 and cooperating with holes 11 of supporting extensions 12, arranged on the inner surface of the main housing. Preferably, ball bearings 13 are inserted between each of the supporting extensions 12 and its corresponding arm 10 to improve a sliding movement between these two elements when the movable unit 9 is translated. The vertical position of the movable unit can be adjusted with respect to the housing, this being implemented by any suitable means, such as micrometric screws, for example.

The movable unit comprises a centrally arranged optical system 100, radially delimited by a sleeve 101, which will be described later in more detail. The sleeve 101 comprises two distant annular step portions 16 on which bearings 17 abut, in order to maintain the position of the sleeve, in the direction of the central axis X1 with respect to the movable unit 9, and to radially guide the sleeve. An annular screw 18 cooperates with a thread portion provided at the front end 19 of the sleeve 15 to tighten the bearings 17 against the corresponding step portion 16.

A rotor 20 is directly arranged around the sleeve 101 in a stationnary manner, the rotor being for example made in the form of a permanent bipolar magnet.

A stator 21 is concentrically arranged around the rotor 20, the stator bearing a plurality of coils 22, two of which are shown on the drawing. Thus, the combination of the rotor 20 and the stator 21 forms a motor whose power supply means are schematically shown by reference 23. The operation of the motor induces a rotational motion of the optical system 100, via rotation of the sleeve 101.

Further, the movable unit 9 comprises, in its lower part, a block 24 in which is provided a central cavity 25 comprising a first upper annular mirror 26 as well as a second lower annular mirror 27. As can be seen from FIG. 1, both annular mirrors 26 and 27 have a planar shape in cross-section.

Conventional means are provided for accurately adjusting the respective positions of the mirrors 26 and 27 such as, for example a set comprising a screw and a spring (not represented) arranged apart from the corresponding mirror. Thus, it is possible to adjust the inclination of the axis of each mirror 26, 27 with respect to the central axis X1, in order to control the quality of the laser beam before it impinges onto the workpiece W.

The block 24 may be hold against the main housing 2 of the apparatus by the way of a plurality of screws 28, for example.

Further, the block 24 comprises a base central opening 29 closed by a cup shaped protection window 30. The function of this window 30 is to prevent the optical elements of the apparatus being spoiled by dust or plasma during the welding process. Means are also provided for accurately adjusting the position of the protection window 30 with respect to the central axis X1 and the annular mirrors 26 and 27, for example by use of a screw 31.

It is to be noted that the protection window can take various forms as long as it fulfils the requirement of being substantially perpendicular to the central rays of the laser beam 5. Thus, the protection window does not play any optical role in the laser beam propagation. In other words, the shape of the protection window is subject to variations, enclosed within the scope of the present invention, as a function of the direction of propagation of the laser beam 5 in the region of the protection window, i.e. as a function of the reflecting surface structure.

Now with reference to FIG. 2, the rotating optical system 100 will be described in more detail. The optical system 100 is schematically represented in FIG. 2, the sleeve 101 being omitted to enhance the description of the optical parts.

Figure 2:
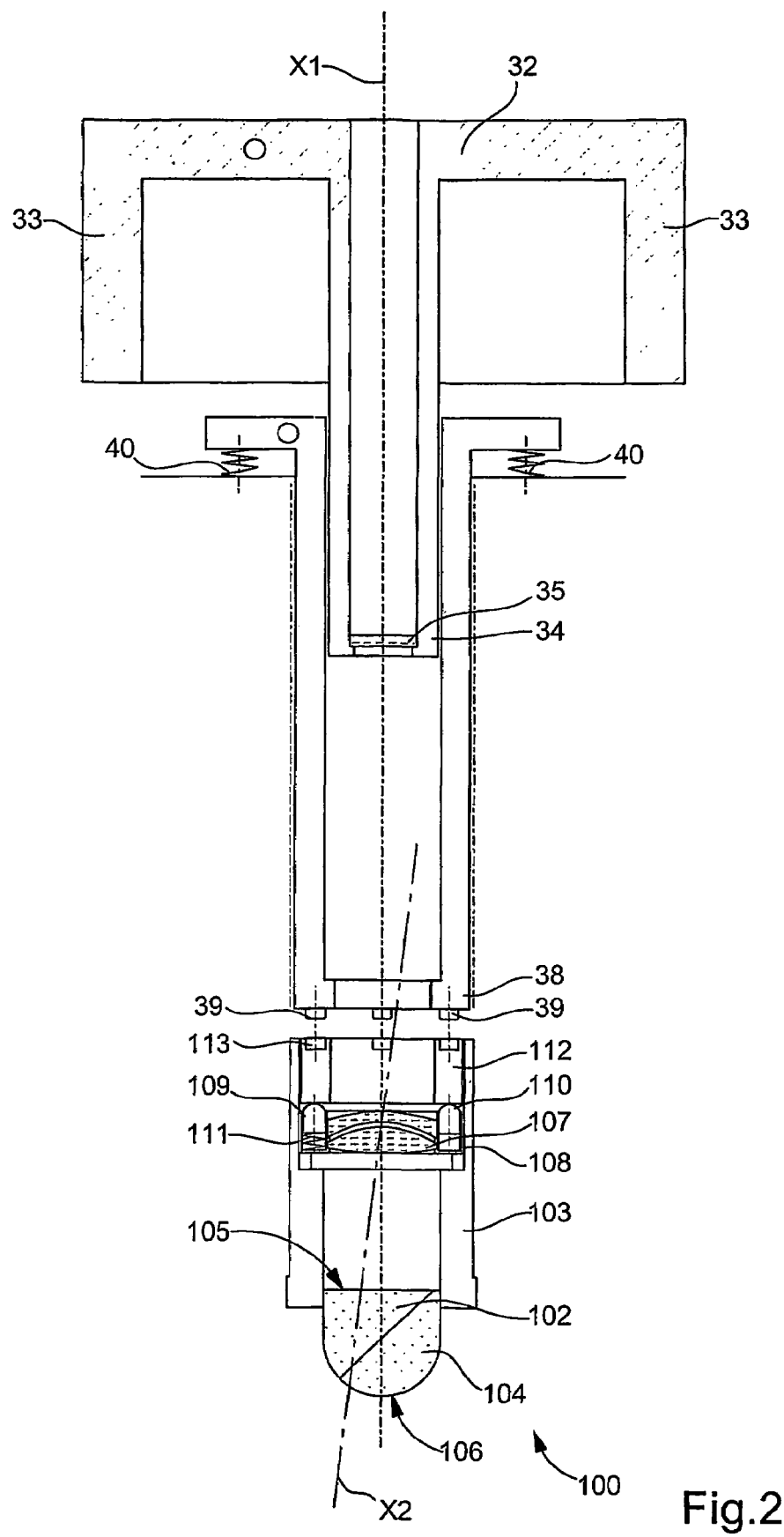
FIG. 2 is an enlarged cross-sectional view of an optical system centrally arranged in the apparatus of FIG. 1.

FIG. 2 shows a first tubular element 32 which is still with respect to the movable unit 9 and comprising a plurality of radial extensions 33 defining a supporting frame. In the region of the end 34 of the tubular element 32 there is arranged a lens 35, the main function of which is to limit the divergence of the laser beam 5.

The first tubular element 32 is partially surrounded by a second tubular element 38, the function of which will be explained later.

The optical system 100 comprises a further sleeve 103 carrying, in particular, an optical device 104 having a planar input surface 105 and a hemispherical output surface 106.

In a preferred embodiment of the present invention, the optical device 104 is a block made of quartz, in which a planar gap, forming the reflecting surface 102, is provided. The gap may be simply filled with air and is oriented with a certain angle with respect to the central axis X1, in order to change the direction of an incident laser beam as shown in FIG. 1. The optical device 104 may be simply maintained by friction inside the sleeve 103.

It is to be noted that the reflecting surface 102 may be made in any other suitable form by those skilled in the art, without departing from the scope of the present invention. However, the use of a mirror may not be as efficient as the use of a gap as regards the risk of heating due to the high power of the laser beam used. Thus, it is clear that the use of a conventional mirror is also possible, in particular in applications for which the use of a high power laser beam is not necessary.

From another point of view, the disclosed shape of the optical device 104 is advantageous as regards its moment of inertia during the rotation of the optical system.

Further, the sleeve 103 houses a correcting lens 107, borne by a supporting member 108. The supporting member 108 is mechanically connected to the sleeve 103 by two pivot pins (not shown) aligned to each other in the direction perpendicular to the plane of FIG. 2. The supporting member also comprises two pins 109 and 110 parallel to each other and to the direction of the central axis X1, arranged in adapted blind holes of the supporting member.

A first pin 109 is supported in its hole by a helicoidal spring 111 while the second pin 110 is held in a fixed position with respect to its hole, for example by a threading (not shown).

An annular element 112, threaded in the sleeve 103, abuts the pins 109 and 110 with its lower surface. Hence, it is apparent from FIG. 2 that, if the annular element 112 is threaded down in direction of the supporting member 108, pressure is exerted on the pins 109 and 110. As pin 110 is fixed to the supporting member, it induces a pivoting motion of the latter while increasing the pressure exerted onto the pin 109. Consequently, the pressure exerted on the pin 109 is transmitted to the spring 111 that becomes more compressed in order to absorb the pressure.

As a result, the correcting lens 107 is tilted or, in other words, its optical axis X2 is rotated with respect to the central axis X1. In the above example, the optical axis X2 is rotated clockwise, as schematically shown in FIG. 2.

The second tubular element 38 plays the part of a tool for operating the annular element 112 from outside the optical system 100. Indeed, it can be seen in FIG. 2 that the second tubular element 38 comprises a plurality of short rods 39 protruding from its lower surface for cooperating with corresponding blind holes 113 provided in the upper surface of the annular element 112. Thus, the second tubular element 38 has to be lowered, by an operator, by compressing supporting springs 40 so that the short rods 39 enter the blind holes 113. Then, and while the springs 40 remain under compression, the second tubular element 38 is rotated to induce a rotational movement of the annular element 112 and thus tilting of the correcting lens 107. When the pressure on the second tubular element 38 is released, the short rods 39 are released from the blind holes 113 and the annular element 112 is maintained in a fixed angular position.

The function of the correcting lens 107 is to act on the laser beam 5 to avoid the occurrence of any geometrical aberration of the image focal point in the welding region, i.e. to improve the quality of the image focal point.

For the same reason, the respective surfaces of the annular mirrors 26 and 27 have to be treated very carefully during their preparation process. Due to the high quality of the mirror surface preparation, the quality of the image focal point is enhanced.

As apparent from FIG. 1, the optical path of the laser beam 5 through the apparatus according to the present invention is such that it is possible to achieve circular welding when the optical system 100 is driven in rotation by the motor.

Figure 3:
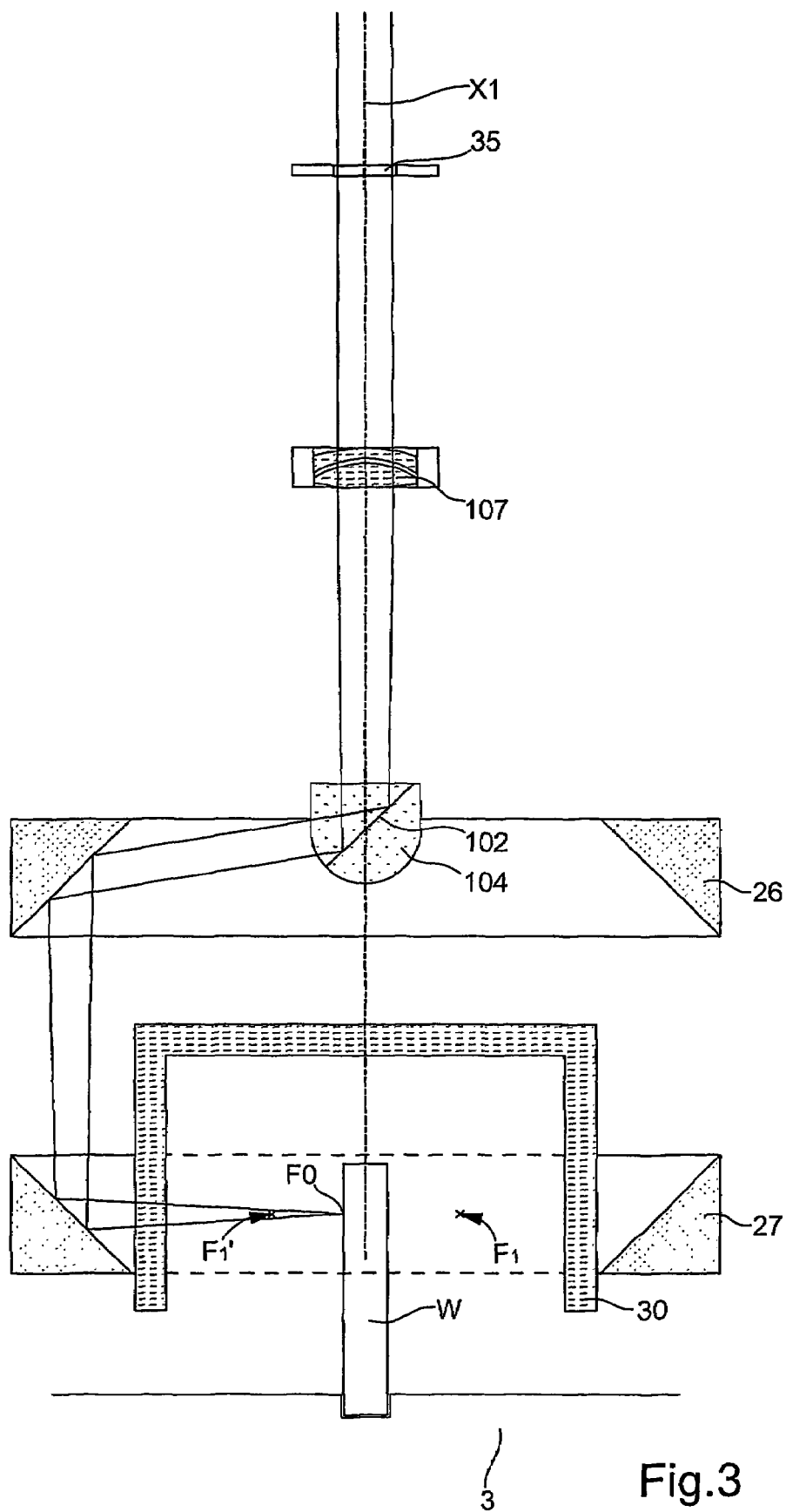
FIG. 3 is a schematic diagram representing the optical path of the laser beam through the optical system of FIG. 2.

Referring now to FIG. 3, the optical principles implemented in the apparatus according to the present invention will be described.

When the movable unit 9 is in its neutral position, the image focal point in the impact region of the workpiece W is located at F0.

Starting from this situation, the user has to make the movable unit 9 translate up or down to adjust the radius value of the circle swept by the laser beam during operation as a function of the dimensions of the workpiece W. The image focus point is thus translated along the optical path of the laser beam, together with the translation of the movable unit 9. When the movable unit 9 is arranged in its highest position with respect to the housing 2, the image focal point is located at F1' and when the movable unit is arranged in its lowest position, the image focal point is located at F1.

Of course, the method that has just been described as regards the adjustment of the focus point position is given as an example and is not limiting. It could be subject to variations due to a choice of a different number of lenses for example or a choice of lenses of a different nature.

Starting from the input of the optical system 100, the laser beam 5 is slightly divergent when it impinges onto the first convergent lens 35, the function of which is to decrease the beam divergence. The optical path extends then through the tiltable lens 107 which is convergent, its focal length being substantial. More particularly, the focal length of the tiltable lens is adapted to the dimensions of the apparatus according to the present invention, so as to form the image focus point on the surface of the workpiece W.

Further, as previously mentioned, the tiltable lens 107 is able to pivot about an axis parallel to the first reflecting surface 102 so that its optical axis X2 is able to be inclined with respect to the central axis X1. Thus, the quality of the image focus point formed on the surface of the workpiece W can be finely adjusted by pivoting the tiltable lens 107, in order to avoid the formation of an ellipse-shaped focus point for example. This last feature is particularly advantageous since the tiltable lens 107 and the first reflecting surface 102 are rotated together so that their mutual orientation remains still during the operation of the apparatus.

Figure 4A:
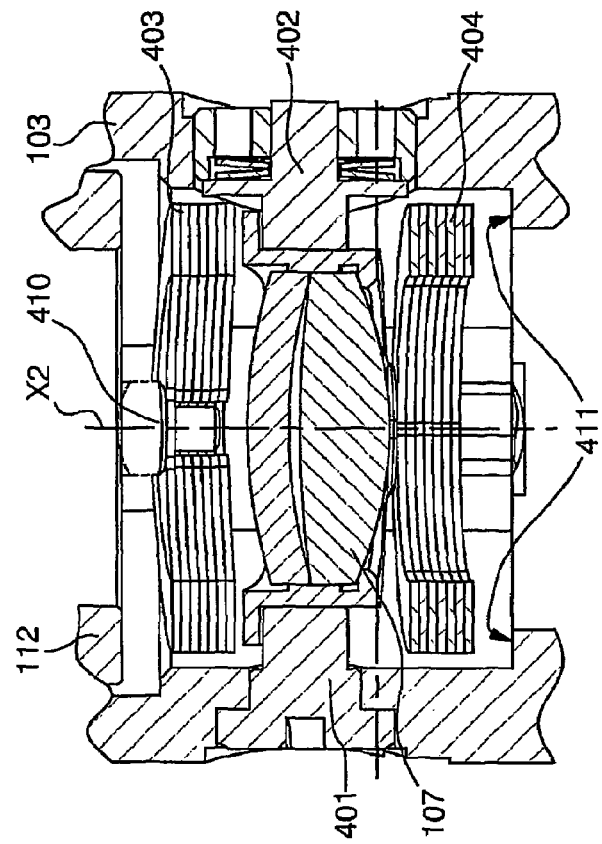
FIG. 4a is an enlarged cross-sectional view of the further sleeve of FIG. 4, the cross-section being perpendicular to that of FIG. 4.
Figure 4:
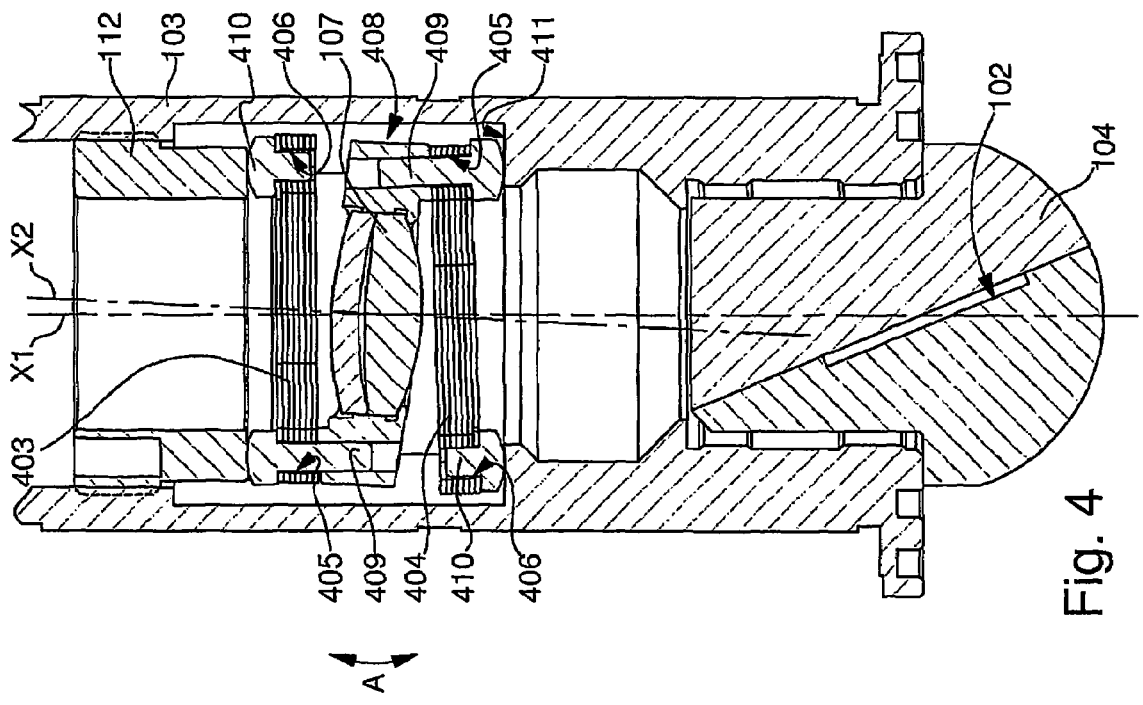
FIG. 4 is an enlarged cross-sectional view of the further sleeve represented in the lower part of FIG. 2 according to an alternate embodiment of the present invention.

Referring now to FIG. 4 and FIG. 4a, an alternate embodiment of the further sleeve 103 according to the present invention, which was described in relation with FIG. 2, will be described.

More particularly, the present embodiment concerns changes in the structure supporting the correcting lens 107 and thus in the means provided for the adjustment of the orientation angle lying between optical axis X2 and central axis X1.

Here again, a supporting member 408 is mechanically connected to the sleeve 103 by means of two pivot pins 401 and 402 aligned with respect to each other in the direction perpendicular to the plane of FIG. 4, i.e. along the plane of FIG. 4a.

Two elastic rings 403, 404 are provided respectively on both sides of the supporting member 408, each of these rings being formed of a stack of a plurality of flat rings as can be seen from FIGS. 4 and 4a. Prefeably, the flat rings are made of metal and are welded or glued together at least partly around their periphery by any adapted known method.

Each of the elastic rings 403, 404 comprises two holes 405, 406 traversing its thickness and located such as to be diametrically opposed, a screw 409, 410 being arranged in each of the holes.

A first screw 409 of each elastic ring tightens the latter to the supporting member 408 in a region of connection, the respective regions of connection being diametrically opposed.

The second screw 410 of each elastic ring simply ensures that the flat rings remain tightened to each other and is thus shorter than the corresponding first screw 409. All screw heads protrude from the elastic rings on their respective sides opposite the supporting member 408.

Consequently, the screw heads of a first elastic ring 403 abuts against the annular element 112 (as disclosed in connection with FIG. 2) while the screw heads of the second elastic ring 404 abuts against a step 411 provided inside the sleeve 103.

Then, the functionning of the assembly formed by the supporting member 408 together with the two elastic rings 403 and 404 will be described.

In a similar fashion to that described in relation with FIG. 2, when the annular element 112 is screwed in the direction of the supporting member 408, pressure is exerted on the screw heads of the first elastic ring 403.

Under the effect of the pressure, the first elastic ring 403 bends thus causing the second elastic ring 404 to bend, as the supporting member 408 is rigid and less prone to bending. As a result of the respective bendings of both elastic rings 403 and 404, the supporting member 408 and thus the optical axis X2 of the correcting lens 107 are inclined with respect to the direction of the central axis X1. More particularly, when the annular element 112 is screwed on FIG. 4, the correcting lens 107 is rotated anti-clockwise.

As already mentioned above, the function of the correcting lens 107 is to act on the laser beam 5 to avoid the occurrence of any geometrical aberration of the image focal point in the welding region, i.e. to improve the quality of the image focal point.

More generally, an important aspect of the apparatus according to the present invention lies in the fact that the tiltable lens 107 and the first reflecting surface 102 are rotated simultaneously.

The apparatus according to the present invention can be used in many different applications. For example, it can be used as an examination apparatus by using the presence of the observation window in combination with an optical sensor 200 as mentioned above. In such a case, the side opening 4 of the housing 2 is not necessary as no laser beam needs to be input in the apparatus. However, this opening 4 can be kept and used as an input for a light source in order to light the region of the workpiece to be examined and enhance the contrast of the observation image.

Another important advantage of the present invention lies in the fact that in order to treat a series of workpieces, the optical system can be kept rotating between two successive workpieces to be treated. The laser beam supply means need only be stopped for the time necessary to remove a treated workpiece and to position a new workpiece, which saves time for the user.

Further conventional features can be added in the above described apparatus without departing from the scope of the present invention. For example, a cooling fluid supply circuit can be provided to cool the bearings 17 as visible in FIG. 1. A device for measuring the rotational speed of the optical system can also be provided.

The invention claimed is:

1. An apparatus for generating a rotating laser beam, in particular for circular welding and/or machining workpieces, said apparatus comprising input means for a laser beam, said laser beam following an optical path through at least one optical system of the apparatus before emerging from said apparatus through an output and impinging onto an impact region of a workpiece, said optical system having a central axis and being intended at least to adjust the position of an image focal point of said laser beam in said impact region, said optical system further comprising a first reflecting surface able to rotate about said central axis, said first reflecting surface being intended to redirect said laser beam into the direction of at least a second reflecting surface intended to reflect said laser beam toward said workpieces, the apparatus comprising means for driving said first reflecting surface in rotation together with said optical system so that their mutual orientation remains still during the operation of the apparatus, wherein said optical system comprises a correcting lens of optical axis arranged so as to be tiltable, such that said optical axis is able to be angled with respect to said central axis to increase the quality of the focus point on said workpieces, and wherein the optical path of said laser beam goes through said correcting lens before being redirected by said first reflecting surface.

2. The apparatus according to claim 1, comprising a housing, wherein said housing includes said laser beam input means, the apparatus further comprising a movable unit, said movable unit being at least partially enclosed in said housing and comprising at least said optical system and said second reflecting surface, and in that said movable unit is able to be translated along the direction of said central axis with respect to said main housing so as to adjust its position along said central axis.

3. The apparatus according to claim 1, wherein said drive means comprise a rotor arranged around said optical system in a fixed manner, a stator being arranged in said movable unit around said rotor.

4. The apparatus according to claim 1, wherein said first reflecting surface is arranged in a fixed manner in said optical system.

5. The apparatus according to claim 4, wherein said at least second reflecting surface is intended to reflect said laser beam toward said axis.

6. The apparatus according to claim 4, wherein the apparatus comprises a third reflecting surface, said second and third reflecting surfaces being of substantially planar shape in cross-section.

7. The apparatus according to claim 6, wherein said third reflecting surface is intended to reflect said laser beam toward said axis.

8. The apparatus according to claim 7, wherein the quality of said image focal point is able to be adjusted by the angle between said optical axis and said central axis.

9. The apparatus according to claim 7, wherein said optical system comprises a sleeve in which are arranged said first reflecting surface and said correcting lens, the latter being borne by a supporting member mechanically connected to said sleeve by two diametrically opposite pins so as to be able to be tilted, an annular element being provided inside said sleeve abutting on said supporting member to adjust the angle between said optical axis and said central axis via a threading.

10. The apparatus according to claim 9, wherein said supporting member comprises two rods protruding from its upper surface and diametrically opposed along a direction perpendicular to that of said pins, a first of said rods being fixed in said supporting member while the second of said rods is arranged in a blind hole and supported by a spring.

11. The apparatus according to claim 10, wherein the apparatus further comprises two elastic rings respectively located on both sides of said supporting member, each of said elastic rings being connected at a certain angle with a region of said supporting member, the respective regions of connection of the elastic rings with the supporting member being approximately diametrically opposed, said supporting member and said two elastic rings forming an assembly arranged in abutment, on the one hand, against said annular element and, on the other hand, against a step provided inside said sleeve.

12. The apparatus according to claim 10, wherein a tubular element is partially engaged in said sleeve and is provided with means able to cooperate with said annular element in order to drive the latter in rotation with respect to said central axis such that the position of the latter in the direction of said central axis can be adjusted from outside said sleeve.

13. The apparatus according to claim 10, wherein said first reflecting surface is arranged in an optical device which has, along the direction of propagation of the laser beam, a planar input surface and a hemispherical output surface, said reflecting surface being formed by a planar gap.

14. The apparatus according to claim 13, wherein said reflecting surface intersects said central axis substantially at the centre of curvature of said hemispherical output surface.

15. The apparatus according to claim 14, wherein the apparatus further comprises a protection window in the region of the apparatus output.

16. The apparatus according to claim 15, wherein said protection window has a shape arranged in such a manner that central rays of said laser beam intersects said protection window substantially in a perpendicular way.

* * * * *